United States Patent
Priller (10) Patent No.: US 12,499,230 B2
(45) Date of Patent: Dec. 16, 2025

(54) METHOD FOR DETECTING SAFETY-RELEVANT DATA STREAMS

(71) Applicant: AVL LIST GMBH, Graz (AT)

(72) Inventor: Peter Priller, Gratwein-Strassengel (AT)

(73) Assignee: AVL LIST GMBH, Graz (AT)

( * ) Notice: Subject to any disclaimer, the term of this patent is extended or adjusted under 35 U.S.C. 154(b) by 1098 days.

(21) Appl. No.: 17/284,359

(22) PCT Filed: Oct. 10, 2019

(86) PCT No.: PCT/AT2019/060339
§ 371 (c)(1),
(2) Date: Apr. 9, 2021

(87) PCT Pub. No.: WO2020/073072
PCT Pub. Date: Apr. 16, 2020

(65) Prior Publication Data
US 2021/0342249 A1    Nov. 4, 2021

(30) Foreign Application Priority Data
Oct. 11, 2018    (AT) .............. A 50889/2018

(51) Int. Cl.
*G06F 21/56*    (2013.01)
*G06F 9/455*    (2018.01)
*G06F 11/34*    (2006.01)

(52) U.S. Cl.
CPC ........ *G06F 21/566* (2013.01); *G06F 9/45558* (2013.01); *G06F 11/3457* (2013.01);
(Continued)

(58) Field of Classification Search
CPC .............. G06F 21/566; G06F 9/45558; G06F 11/3457; G06F 21/565; G06F 2009/45587;
(Continued)

(56) References Cited

U.S. PATENT DOCUMENTS 8,127,360 B1    2/2012    Wilhelm et al.
8,584,239 B2 *  11/2013   Aziz ...................... H04L 63/20
                                                         713/188
(Continued)

FOREIGN PATENT DOCUMENTS

CN    1711525 A    12/2005
CN    108255711 A    7/2018
(Continued)

OTHER PUBLICATIONS

Bayer, U., et al. "Dynamic analysis of malicious code" J. Computer Virology, vol. 2, pp. 67-77 (2006) (Year: 2006).*
(Continued)

*Primary Examiner* — Jay Hann
(74) *Attorney, Agent, or Firm* — Dykema Gossett PLLC (57) ABSTRACT

A method for detecting safety-relevant data streams which occur in a hardware system during the execution of at least one data processing task. In one example embodiment, the method includes the steps of: defining critical data via an interface, mapping of the hardware system onto a simulation model capable of running in a simulation environment; executing the at least one data processing task as a simulation with the simulation model in the simulation environment, monitoring the creation, transmission and deletion of the critical data and instances of the critical data in the simulation model during the execution of the at least one data processing task, and identifying and logging the security-relevant data streams.

8 Claims, 4 Drawing Sheets

(52) U.S. Cl.
CPC .. *G06F 21/565* (2013.01); *G06F 2009/45587* (2013.01); *G06F 2221/034* (2013.01); *G06F 2221/2141* (2013.01)

(58) Field of Classification Search
CPC ....... G06F 2221/034; G06F 2221/2141; G06F 11/3684; G06F 11/3688; G06F 2009/45575; G06F 2009/45591; G06F 9/455; G06F 9/5055; G06F 21/556; G05B 9/5055

See application file for complete search history.

(56) References Cited

U.S. PATENT DOCUMENTS

| | | | | |
|---|---|---|---|---|
| 8,881,282 | B1* | 11/2014 | Aziz | G06F 21/554 726/23 |
| 8,996,864 | B2* | 3/2015 | Maigne | G06F 9/45558 726/4 |
| 9,479,526 | B1* | 10/2016 | Yang | G06F 21/554 |
| 9,519,781 | B2* | 12/2016 | Golshan | G06F 21/566 |
| 9,846,774 | B2* | 12/2017 | Alme | G06F 21/566 |
| 10,146,937 | B2* | 12/2018 | Fischer | G06F 30/33 |
| 10,740,459 | B2* | 8/2020 | Diehl | G06F 21/567 |
| 12,013,941 | B2* | 6/2024 | Kurtz | G06F 21/577 |
| 2013/0139262 | A1 | 5/2013 | Glew et al. | |
| 2016/0085567 | A1 | 3/2016 | Holler | |
| 2017/0185437 | A1 | 6/2017 | Thomas et al. | |
| 2018/0032760 | A1 | 2/2018 | Hu et al. | |
| 2019/0258805 | A1* | 8/2019 | Elovici | G06F 11/261 |
| 2020/0202008 | A1* | 6/2020 | Pfleger de Aguiar | G06F 11/3485 |

FOREIGN PATENT DOCUMENTS

| | | |
|---|---|---|
| JP | 2005301981 A | 10/2005 |
| JP | 2013242633 A | 12/2013 |
| JP | 2014225160 A | 12/2014 |
| WO | 2015067649 A1 | 5/2015 |
| WO | 2016/141998 A1 | 9/2016 |

OTHER PUBLICATIONS

Jacob, G., et al. "Behavioral detection of malware: from a survey towards an established taxonomy" J. Computer Virology, vol. 4, pp. 251-266 (2008) (Year: 2008).*

Cao, Y., et al. "Osiris: A Malware Behavior Capturing System Implemented at Virtual Machine Monitor Layer" Hindawi, Mathematical Problems in Engineering, vol. 2013, article ID 402438 (2013) (Year: 2013).*

Gruss, D.Maurice, C.Wagner, K.Mangard, S.: "International Conference on Detection of Intrusions and Malware, and Vulnerability Assessment", Jul. 2016, Springer, article "Rowhammer.js: A remote software-induced fault attack in javascript", pp. 300-321.

Hu, W.Irturk, A.Tiwari, M.Sherwood, T.Kastner, R.: "Proceedings of the 48th Design Automation Conference", Jun. 2011, ACM, article "Information flow isolation in I2C and USB", pp. 254-259.

Kocher, P. C.: "Annual International Cryptology Conference", Aug. 1996, Springer, article "Timing attacks on implementations of Diffie-Hellman, RSA, DSS, and other systems", pp. 104-113.

Lipp M.Gruss D.Schwarz M.Bidner D.Maurice C.Mangard S.: "Computer Security—ESORICS 2017", vol. 10493, Sep. 2017, article "Practical Keystroke Timing Attacks in Sandboxed JavaScript".

Ye, X.Fan, D.Sun, N.Tang, S.Zhang, M.Zhang, H.: "Proceedings of the 2013 International Symposium on Low Power Electronics and Design", Sep. 2013, IEEE Press, article "SimICT: A fast and flexible framework for performance and power evaluation of large-scale architecture", pp. 273-278.

\* cited by examiner

METHOD FOR DETECTING SAFETY-RELEVANT DATA STREAMS

CROSS-REFERENCE TO RELATED APPLICATIONS

This application is a national stage filing based upon International PCT Application No. PCT/AT2019/060339, filed 10 Oct. 2019, which claims the benefit of priority to Austria application No. A 50889/2018, filed 11 Oct. 2018.

BACKGROUND

The invention relates to a method for detecting safety-relevant data streams which occur in a hardware system during the execution of at least one data processing task.

A typical task in information and communication technology (ICT) systems is to prevent access to information (data) by unauthorized users or applications. For this purpose, different methods are implemented in the prior art, for example access controls (which are also referred to with the English technical terms "access rights" or "access policies"), the management of access rights ("authorization") and the isolation of processes and/or storage spaces (e.g., sandboxing). At a lower level, this can be implemented in the hardware, for example, via memory management units ("Memory Management Units"—MMU).

Conceptual or implementation errors, targeted attacks on the authentication, unconscious information flows via secondary routes ("side channels") and similar mechanisms can give rise to opportunities for undesired access to data ("leaks"). An attack then exploits one or more vulnerabilities to influence the ICT system and/or gain access to data with a certain result ("impact"). This means that the confidentiality rules of a system can be circumvented or penetrated.

The confidentiality properties of hardware or computer systems are primarily met by adhering to principles and regulations regarding design, implementation and operation such as:
  Security-per-design,
  Using an approach that has proven successful ("Best Practice"),
  Compliance with processes and standards (e.g., ISO/IEC 27001 and 27002, ISO 15408/Common Criteria, NIST CSF, SAE J3061),
  Principles such as in-memory-encryption,
  Address Space Layout Randomization (ASLR),
etc.

During the development, and especially at the end, and after each integration step, the implementation and thus the resulting behavior must be tested. This can be done, for example, by reviewing the architecture and implementation of the software and hardware (audits). This approach is effective and has been in use for decades, but it is also very time-consuming and difficult to automate. First and foremost, however, the sources (code, models) of the system must be available. For reasons of confidentiality, for example, this is not always desirable and often not even possible (e.g., when using third party software libraries).

A static code analysis (which can be automated but which is not very effective at finding leaks) or a model inspection (which in turn requires a disclosure of the sources is another option. What these methods also have in common is that attacks on the processing chain (including transmission, storage and processing) and weak points in this chain cannot be detected. This applies, for example, to the compilation, linking, transfer (download, etc.), storage (e.g., to flash memory, hard disk, etc.), the execution in the software (interpreter, virtual machine, etc.) and finally the hardware. This is precisely why many successful attacks start right there:

An attack via a sandbox is described, for example, by Lipp M., Gruss D., Schwarz M., Bidner D., Maurice C., Mangard S. (September 2017) in the article "Practical Keystroke Timing Attacks in Sandboxed JavaScript," in: Foley S., Gollmann D., Snekkenes E. (eds) Computer Security—ESORICS 2017, Lecture Notes in Computer Science, Vol. 10493.

A cache attack is described, for example, by Gruss, D., Maurice, C., Wagner, K., & Mangard, S. (July 2016) in "Flush+Flush: a fast and stealthy cache attack," in: International Conference on Detection of Intrusions and Malware, and Vulnerability Assessment (p. 279-299). Springer, Cham.

An attack directed at the storage is described by Gruss, D., Maurice, C., & Mangard, S. (July 2016) in "Rowhammer.js: A remote software-induced fault attack in javascript," in: International Conference on Detection of Intrusions and Malware, and Vulnerability Assessment (p. 300-321), Springer, Cham.

In addition to the static test, there are also dynamic tests that examine the system behavior during the execution. Dynamic testing supplements static testing, especially for scenarios that do not correspond to any known or new patterns (which could not yet be searched for statically), as well as for cases that cannot be found statically in the analysis due to complexity or properties that were not considered. If there is no access to the complete system description and the source code, the possibilities of static tests are severely limited anyway, which can increase the importance of dynamic testing even further.

Dynamic test methods are mostly based on the (manual or automatic) execution of defined application scenarios ("test cases"). The challenge lies among other things
  (i) in the appropriate design of these test cases in order to become aware of security problems,
  (ii) in the execution (which is ideally done automatically in order to be able to execute the largest possible number of test cases in a given time), and
  (iii) in the correct evaluation of the test result, especially the detection of a security vulnerability.

In connection with the present invention, "test cases" are preferably referred to as specifications which define the preconditions, inputs, execution conditions, test methods and/or the expected results of a specific test or a specific simulation.

J., Hu, W., Irturk, A., Tiwari, M., Sherwood, T., & Kästner, R. describe in the article "Information flow isolation in I2C and USB" (June 2011) in: Proceedings of the 48th Design Automation Conference (p. 254-259), ACM, specially modified hardware, for example in an I2C peripheral module, in which registers and internal buses have been expanded by, for example, an additional bit per data word. This bit (which is called "taint" in the article) marks "critical" information and "migrates" with this information through the hardware. Data processing steps (e.g., a logical link) are expanded by this marking bit so that the influence of the critical data on the result can be mapped and followed up on. However, this procedure cannot be implemented without the specially modified hardware.

The object of the present invention is, inter alia, to provide dynamic tests without hardware changes, but the method should not only be usable for standard hardware, but can, in particular, be used in the field of industrial automation and for embedded systems, for example in the automotive sector.

SUMMARY OF THE INVENTION

These and other objects are achieved according to the invention by a method of the type mentioned at the beginning, which has the following steps: Defining critical data which may be stored in at least one storage unit of the hardware system or that is transferred into the hardware system via an interface; mapping the hardware system onto a simulation model capable of running in a simulation environment; executing the data processing task as a simulation with the simulation model in the simulation environment; monitoring the creation, transmission and deletion of the critical data and of instances of the critical data in the simulation model during the execution of the data processing task; identifying and logging the security-relevant data streams. With the help of this method, the occurrence of undesired data streams in the hardware system can be recognized without having to modify this hardware system for this purpose. In particular, in current microcontroller systems that are based on standard CPUs (e.g., by Intel, ARM, Infineon, etc.) it is almost not possible to obtain such modified hardware; there are, however, simulators that are suitable for almost all of these CPUs that can be used as a simulation environment.

In connection with the present invention, the term "simulation environment" refers, in particular, to a computer system with simulation software running on it, which is suitable for simulating the simulation model. In contrast to the real hardware system, the simulation environment makes it possible, in particular, to monitor the current statuses of the data, for example in memories and registers, as well as all the processes that modify this data. This makes it possible, in particular, to monitor the creation, transmission and deletion of data in the simulation environment. Corresponding simulation environments, which are suitable for simulating a simulation model of a specific hardware system, are known in the prior art, and it is within the ability of an average person skilled in the art, if said person has knowledge of the teachings disclosed herein, to select a suitable simulation environment for a given hardware system and to map this hardware system onto a simulation model that can be executed by the selected simulation environment.

In connection with the present description, an "instance" is a copy of a critical datum which at least at a certain point in time (for example, at the time of creation/instantiation) is directly dependent on the critical datum under consideration. An instance can thus be, for example, a copy of a critical datum but also a copy and (re)coding of the datum. A recoding takes place, for example, when the original datum is an integer number and the instance is a float representation thereof).

In connection with the present disclosure, a "hardware system" is generally a set of physical components (i.e., the electronic and mechanical components) of a data processing system and their peripherals. The hardware system can, in particular, be a computer system according to a known system architecture. A hardware system can, however, also be a structure of a plurality of interacting hardware components that does not correspond to a "computer system" in the narrower sense, for example a sensor network or an ad-hoc network with a plurality of hardware components.

In order to map the hardware system onto a simulation model, the hardware system can advantageously be divided into a large number of hardware components, which are connected to one another via at least one communication device, and can exchange data via this communication device with each hardware component having at least one communication unit, at least one storage unit and at least one processor unit. With a suitable choice of this classification, which forms the basis for modeling the simulation model, the hardware system can be simulated and observed on different levels, for example on the level of an abstract machine or a virtual machine, on the CPU instruction level, on the gate or Bit level, on communication or bus level, etc.

In an advantageous embodiment, critical data can be defined by defining data properties. In connection with the present disclosure, data properties are understood to refer, in particular, to attributes relating to the data content, the time of creation or generation, the processing time, the address in the storage, dependencies on the system status, dependencies on other (critical) data, etc., and combinations that can be defined therefrom. This makes a test possible, for example, without knowledge of the source code of the software components.

An example of a relevant combination of data attributes is the monitoring of the runtime, for example, from the creation and the deletion of call stack data. One type of side-channel attack uses information about the runtime of the key checking routine, for example, to indirectly access information about the key, cf. Kocher, P. C. (1996, August), Timing attacks on implementations of Diffie-Hellman, RSA, DSS, and other systems. In Annual International Cryptology Conference (p. 104-113). Springer, Berlin, Heidelberg.

A warning message can advantageously be created when at least certain security-relevant data streams are identified. The warning message can be displayed immediately on a user interface of a control and monitoring system used to control the simulation environment so that the tester can decide whether to abort the simulation or allow it to continue. If necessary, the simulation can be terminated automatically if a warning message occurs.

The identified safety-relevant data streams can advantageously be stored in an evaluation with the evaluation possibly being represented graphically. This makes it possible for the tests that are carried out to be logged and reported.

The course of the simulation can advantageously be logged as well. In addition, if necessary, the comprehensive process (including the previous history) can also be recorded and, if necessary, related to the data stream log, which assists with the later analysis/diagnosis/troubleshooting.

In an advantageous manner, the data processing task can result from the execution of application software, which is operated if necessary while processing defined test cases. This makes it possible to test application software, either in parts or as a whole, and learn more about the interaction of the application software with underlying software parts (middleware, frameworks, libraries, operating system, etc.) and the given hardware system.

In a further advantageous embodiment of the method according to the invention, portions of the hardware system can be divided into a permitted domain and a prohibited domain. This makes it possible to increase the relevance for hits.

The division into a permitted and a prohibited domain can take place, for example, in the course of the definition of critical data, in the course of the modeling of the simulation model or even later, in which case the division can, in particular, be specified by comparable a hardware system either on the basis of experience by a programmer or a test person or on the basis of test procedures that were carried out previously. Given the knowledge of the teachings disclosed herein, it is within the ability of an average person skilled in the art to make an appropriate division.

At least the following data streams can advantageously be identified as security-relevant data streams: the transmission of a critical datum or instances thereof via a communication device of the prohibited domain, the deletion of a critical datum while at least one instance of the critical datum continues to exist, the creation of an instance of a critical datum in the prohibited domain, the continuation of a critical datum after a certain point in time and/or system status, especially after the completion of the data processing task or after the termination of an application. If necessary, additional rules, such as a dependence of the criticality of time, the system states, etc., can be taken into account by observing the processes. (This essentially means that the definition of the permitted and prohibited domains is changed depending on the simulation process.)

In connection with the present invention, "security-relevant data streams" are, for example, data streams that correspond to a specific criterion defined for the respective application, for example, one of the criteria listed in the preceding paragraph.

BRIEF DESCRIPTION OF THE DRAWINGS

The present invention is explained in more detail below with reference to FIGS. 1 to 5, which show exemplary, schematic and non-limiting advantageous embodiments of the invention.

DETAILED DESCRIPTION

Figure 1:
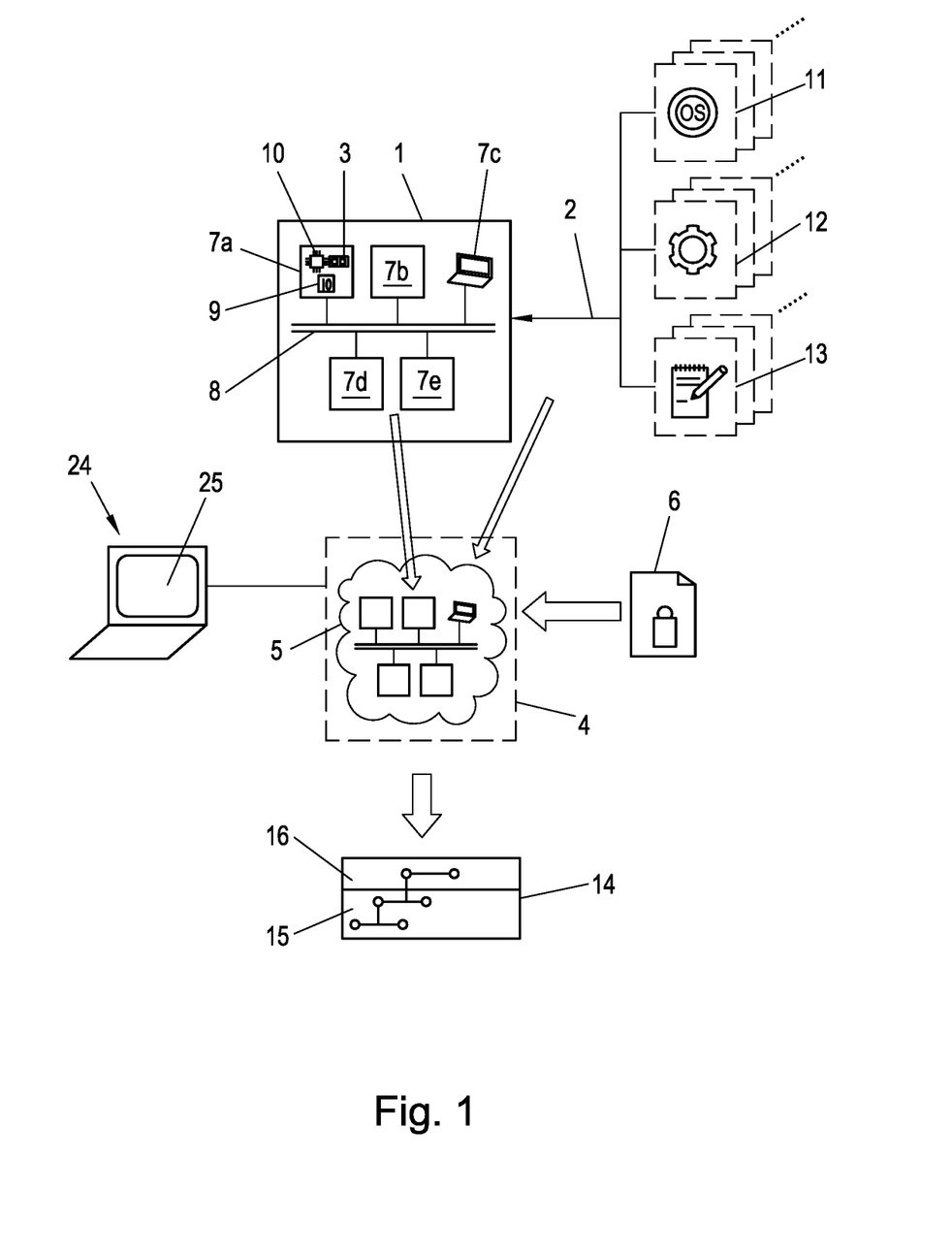
FIG. 1 is a schematic representation of the units and the method steps involved in the method according to the invention.

The essential entities of the method according to the invention are shown in abstract form in FIG. 1. A hardware system 1 generally consists of several hardware components 7 (in FIG. 1, the hardware components are provided with the lowercase letters a to e to distinguish them), which are connected to one another via at least one communication device 8 and which can exchange data via this communication device 8. For this purpose, each hardware component 7 usually has a communication unit 9, a storage unit 3 and a processor unit 10, as shown symbolically in FIG. 1 for the hardware component 7a. The hardware component 7c shown in FIG. 1 can, for example, be a conventional (notebook) computer on which, for example, control software runs for other hardware components. The hardware system 1 can also have "nested" hardware structures, that is to say that a hardware system is part of a higher-level hardware system. A hardware system 1 (or a hardware component 7 of a hardware system 1) can, for example, also be designed as an SoC (system on a chip). Examples of such a hardware system include microprocessors of the XC27x8X series made by Infineon. The communication device 8 is formed by an internal bus system; the communication unit 9 can be seen in the bus coupling of the CPU; the internal registers and the cache are to be regarded as the storage unit 3 and the processor unit 10 would be the CPU of the SoC. If applicable, peripheral components such as a CAN controller, a PWM controller or others can be defined as further hardware components 7 of the hardware system 1.

Depending on the level of representation, hardware components 7 of the hardware system 1 can include units of various types. Further examples of hardware components 7 include:

control units in vehicles (e.g., an ECU or other control units for the engine, gearbox, ABS, ESP, etc.), intelligent sensors in a sensor network, for example in an IoT system, which communicate for example via a WSN (wireless sensor network), CPU modules and/or I/O modules in a programmable (industrial) controller (PLC), nodes in the cloud or computer clusters.

In connection with a conventional PC, for example, the main CPU could be defined as a hardware component 7, with the peripheral controllers such as disk, keyboard, graphics card, etc. being defined as further hardware components.

The communication device 8 can be an internal or external bus system or another wired or wireless communication device 8. Examples of communication devices 8 include device-internal buses such as PCI, PCI-X, PCIe, AGP, USB, I2C, etc., and external or field buses such as CAN, LIN, Flexray, (automotive) Ethernet, MOST, etc. In the vehicle sector, these are generally referred to as "In-Vehicle Networks—IVN."

Deviating from the form shown in FIG. 1, the hardware system 1 can also comprise different arrangements of hardware components 7 and communication systems 8; the hardware system 1 can, for example, comprise a more complex network with, for example, several hierarchical buses, star or mesh networks, etc., being included. An example of a hardware system 1 that is relevant in practice is embedded systems.

In connection with the present disclosure, an "embedded system" is referred to as a hardware system 1 which is integrated in a technical context. Embedded systems are used, for example, in medical technology devices, in household appliances such as washing machines or refrigerators, in entertainment electronics such as televisions, DVD players, set-top boxes, routers or mobile phones in various road, rail or water vehicles such as motor vehicles, aircraft, ships or other transport devices, in industrial plants, and also in space travel.

In the case of a complex overall system (i.e., in a complex technical context), the embedded system can be a network of a plurality of otherwise autonomous, embedded (sub) systems that are networked with one another via different communication devices 8, for example several bus systems with different security, data throughput and/or speed specifications.

The hardware system 1 and/or individual or all of the hardware components 7 contained therein optionally have an operating system 11, including a runtime environment, runtime libraries, drivers, etc., which allows them to process data processing tasks 2 or to participate in the processing in a known manner. The operating system 11 can, for example, be a conventional or specialized computer operating system that controls the operation and interaction of the internal and the external hardware of a computer. Examples of operating systems 11 include Windows, Android, iOS, macOS, Linux, or UNIX in the area of personal computers, tablets and smartphones QNX, Elektrobit OS, ROS, AUTOSAR in the automotive sector or proprietary products from various manufacturers. Depending on the level of detail of the representation of the hardware system 1, a single operating system 11 can also be assigned to a plurality of hardware components 7. This is the case, for example, when the hardware system 1 is (or comprises) a computer system whose internal hardware components 7 communicate with one another via corresponding bus systems controlled by the operating system. Depending on the system boundaries and modeling, however, "smaller," "larger" or "nested" units can also be defined as hardware components 7 in which case the respective set of rules is understood as the operating system that determines the functionality of this unit.

In connection with the present description, the operating system 11 is understood to be a compilation of program instructions which control the function of the system resources of a hardware component 7 and/or a group of hardware components 7 and/or an entire hardware system 1 or the data streams occurring therein. A plurality of operating systems 11 can also be provided in a hardware system 1.

Even if the level of detail of the representation of the hardware system 1 does not change this hardware system 1 per se, it should be noted that the type of representation or the division into hardware components 7 is essential for the modeling step described later, i.e., the creation of a simulation model 5 of the hardware system 1.

Depending on the parameter data 13, application software 12 results in different data processing tasks 2 which are processed by the hardware system 1 or the individual hardware components 7. In connection with the present invention, each process step (or each group of process steps) can be viewed as a "data processing task" 2, which is (are) executed by a hardware component 7 or by a plurality of hardware components 7 together. In particular, in connection with the present disclosure, process steps are viewed as data processing tasks in which there is a data stream.

In connection with the present disclosure, the following are particularly referred to as "data streams:"
creating a copy of a datum stored at a storage address of a storage unit 3 at another storage address of the same storage unit 3 or a different storage unit 3,
changing a datum or a copy of a datum,
deleting a datum stored at a storage address of a storage unit 3,
transmitting a datum item from a hardware component 7 via a communication device 8 used by a plurality of hardware components to one (or a plurality of) other hardware components 7, as well as
transmitting and receiving data via external interfaces of the hardware system 1.

In connection with the present description, all influencing factors set outside the program that influence the execution of the application software 12 are referred to as "parameter data" 13. Parameter data 13 can relate to settings selected by the developer or user, result from specific environmental conditions or specify basic settings, default values, operating modes, etc., that are typically defined in configuration files (sometimes called "INI" or "CFG" files). Another example of such parameter data 13 is sensor data that is processed in the hardware system 1 (which can be a system embedded in a vehicle, for example) in accordance with the application software 12. In the real hardware system 1, this parameter data 13 thus results from the current environmental conditions; in the course of a simulation of the hardware system 1, corresponding parameter data 13 can be provided and processed as test cases.

The stacked display of the symbols for the operating system 11, the application software 12 and the parameter data 13 is intended to show that a plurality of operating systems and/or application software units and/or parameter data sets can be relevant for a hardware system 11.

Due to the complex architecture of the hardware system 1 and the assigned operating system 11 or the assigned operating systems 11 and due to the structure of the application software 12 created with modern programming tools, it is no longer possible by means of static methods to completely predict, on the basis of the source code of the application software 12, which data streams will trigger a data processing task in a specific hardware system 1. Furthermore, the check can only take place by using a limited number of exemplary parameter data 13. However, it is precisely these that can open up vulnerabilities, for example, through unconscious information streams via secondary routes, which can be exploited for an attack.

It is not possible, however, to monitor the data streams taking place in a hardware system 1 since special hardware would be required for this purpose. An error analysis using special hardware is only of limited significance for the unchanged actual hardware.

In order to obtain an insight into the data streams that cannot be viewed per se, the hardware system 1 according to the invention is mapped as a simulation model 5 that can run in a simulation environment 4.

The simulation environment 4 can be any suitable simulation platform that is able to simulate the data streams that occur in the simulation model 5 of the hardware system 1 during the execution of a data processing task in order to make them observable.

The simulation in the simulation environment 4 allows the data streams executed by the individual hardware components 7 to be observed and logged. This observation and logging is preferably limited to critical data that is specified in a control and monitoring system 24 via a corresponding user interface 25 and made available in a "definition of critical data" 6 of the simulation environment 4 before the simulation is carried out. The control and monitoring system 24 allows a user to use the user interface 25 to create all the definitions and instructions that are required for running the simulation in the simulation environment 4, including the modeling of the simulation model 5, the definition of critical data 6, the starting and canceling of a simulation run and the definition or selection of parameter data 13 or test cases.

Techniques and systems that make it possible for the hardware system 1 to be mapped into a simulation model 5 are known from prior art and have been described, for example, by Ye, X., Fan, D., Sun, N., Tang, S., Zhang, M., & Zhang, H. in the article "SimICT: A fast and flexible framework for performance and power evaluation of large-scale architecture," September 2013, in: Proceedings of the 2013 International Symposium on Low Power Electronics and Design (p. 273-278), IEEE Press.

The simulation model 5 can, for example, only depict part of a larger overall system, for example, if not all components of the overall system can be simulated in software, if the creation of a complete simulation model would be too complex or if such a simulation would require too much computing time. In this case, parts that are not relevant for the data stream can be coupled to the simulation environment 4 as real hardware elements, for example, in the manner of a hardware-in-the-loop simulation. In a similar way, the simulation environment 4 on which the simulation model 5 runs can exchange data with one (or more) further simulation environment(s) with the further simulation environment simulating elements whose data base does not have to be examined according to the inventive method and can therefore have a simpler structure.

In the simulation, the simulation model 5 executes data processing tasks 2 that result from the application software 12 with the parameter data 13 being determined on the basis of previously defined test cases. A software program as a whole, for example, or individual parts thereof can be processed. The test cases can, for example, be designed for a process of the hardware system 1 that is as realistic as possible, but they can also represent special scenarios or relate to operating conditions in limit ranges. Methods for creating and optimizing test cases in connection with driver assistance systems for vehicles are disclosed, for example, in WO 2015/067649 A1 and are referred to therein as "test scenarios." While the simulation environment 4 allows the simulation model 5 to run according to such test cases, the creation, transmission, processing/linking and deletion of physical copies of critical data in the simulation model 5 is monitored and logged by the control and monitoring system 24.

After the simulation has ended (or during the simulation), the control and monitoring system 24 uses the logged data to create an evaluation 14, which optionally also includes a graphic representation. The evaluation 14 shows, in particular, transmission processes of critical data via wired and/or wireless data connections as well as the creation and deletion of physical copies of critical data at any storage locations in the representation of the hardware system 1 modeled as a simulation model 5. Instances of critical data that can be present in a storage unit 3 after the simulation has ended are of particular interest. This can be the case if a copy of a critical datum 6 has not yet been deleted or overwritten after the simulation (or after the end of a delimited data processing task 2 or after the deletion of the critical datum 6 at the original storage location) and is therefore still present at an undetected specific address in one of the storage units 3.

In the evaluation 14, the storage units 3 and/or the communication devices 8 and/or the communication units 9 can each be advantageously divided into an "allowed domain" 15 and a "forbidden domain" 16. The domains can, for example, be defined on the basis of entire storage units 3 or specific address spaces in storage units 3, on the basis of bus addresses or on the basis of hardware components 7, whereby the definition or division can also take place via the control and monitoring system 24.

The simulation model 5 can represent the hardware system 1 to be executed in a definable degree of detail as required. The simulation model 5 can, for example, be modeled on the level of CPU instruction sets (CPU instruction level) or on a hardware gate level. The level of detail required is related to the type of attack to be tested. To find unwanted data streams due to software errors, a simulation at the instruction level of the CPU is sufficient, for example. In order to find unwanted data streams due to gaps in the hardware (such as in the security gaps known as SPECTER and MELTDOWN) or cache attacks, simulations must be carried out on the hardware/gate level, for example.

The hardware system 1 can, in particular, also include subsystems such as those with direct storage access, peripheral devices, etc., and communication interfaces.

Figure 2:
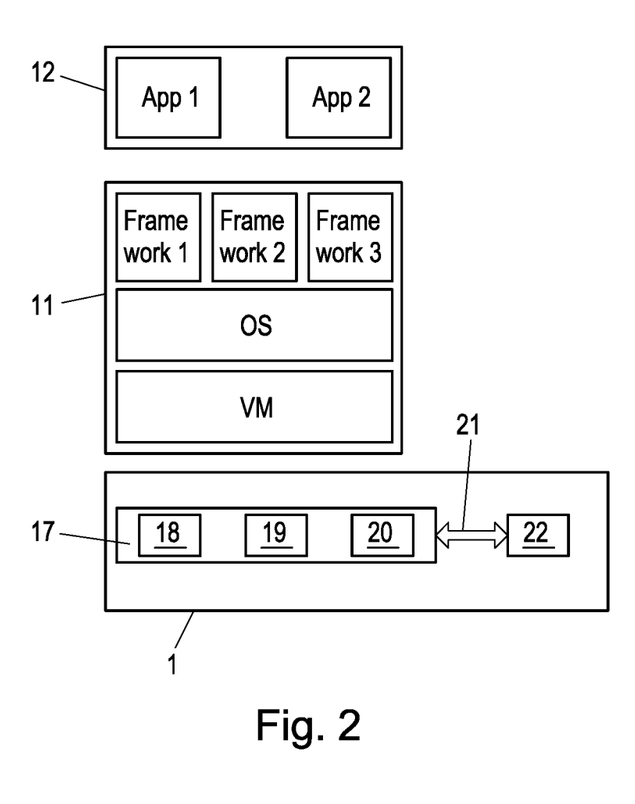
FIG. 2 is a schematic representation of a hardware system and the software running on it.

FIG. 2 shows a concrete example of a hardware system 1 on which an operating system 11 runs and with which application software 12 can be executed. The hardware system 1 is designed in accordance with a customary computer architecture, with a processor 17 having a processor core 18, a processor cache 19 and a processor IO 20. The processor 17 can communicate with further components 22 via a bus architecture 21. The unit consisting of the processor core 18, the processor cache 19, the processor IO 20, the bus architecture 21 and further components 22 can be viewed as a cyber-physical system that exchanges information with the (real) environment (typically via sensors and actuators). Such a cyber-physical system could be, for example, an automotive control unit (ECU).

An operating system 11 with which application software 12 can be processed runs on the hardware system 1.

In line with the generic description made in connection with FIG. 1, the processor 17 in FIG. 2 corresponds, for example, to a first hardware component 7a, the processor core 18 corresponds to the processor unit 10, the processor cache 19 corresponds to the storage unit 3, the processor IO 20 corresponds to the communication unit 9, the BUS arrangement 21 corresponds to the communication device 8 and the further components 22 can comprise other hardware components 7. As already mentioned, a different type of modeling is also possible, for example, on a more detailed level.

Figure 3:
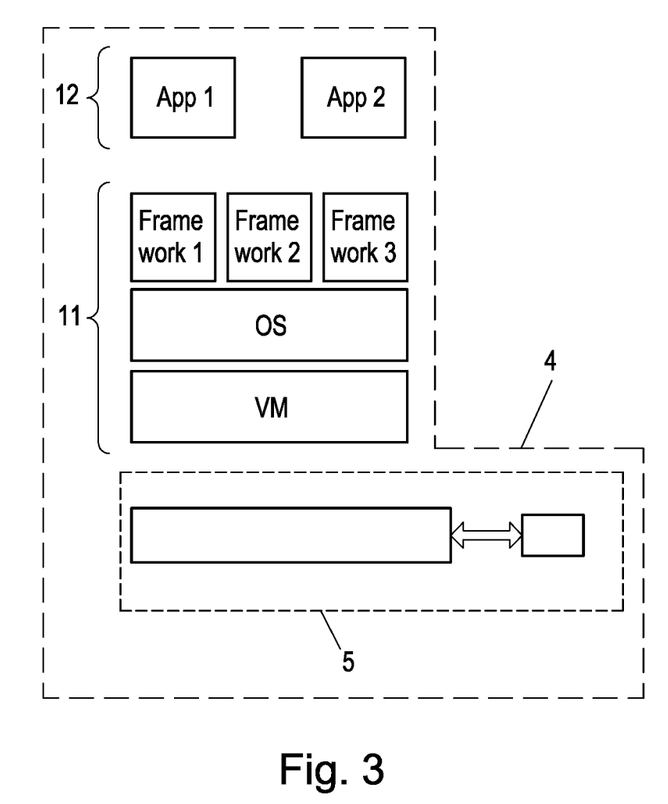
FIG. 3 is a schematic representation of a simulation environment in which the hardware system of FIG. 2 is mapped as a simulation model.

In FIG. 3, a modeling of the hardware system 1 from FIG. 2 is shown by way of example in a simulation model 5, which can be operated by a simulation environment 4 as a simulation of the hardware system 1, taking into account the operating system 11 and the application software 12.

Figure 4:
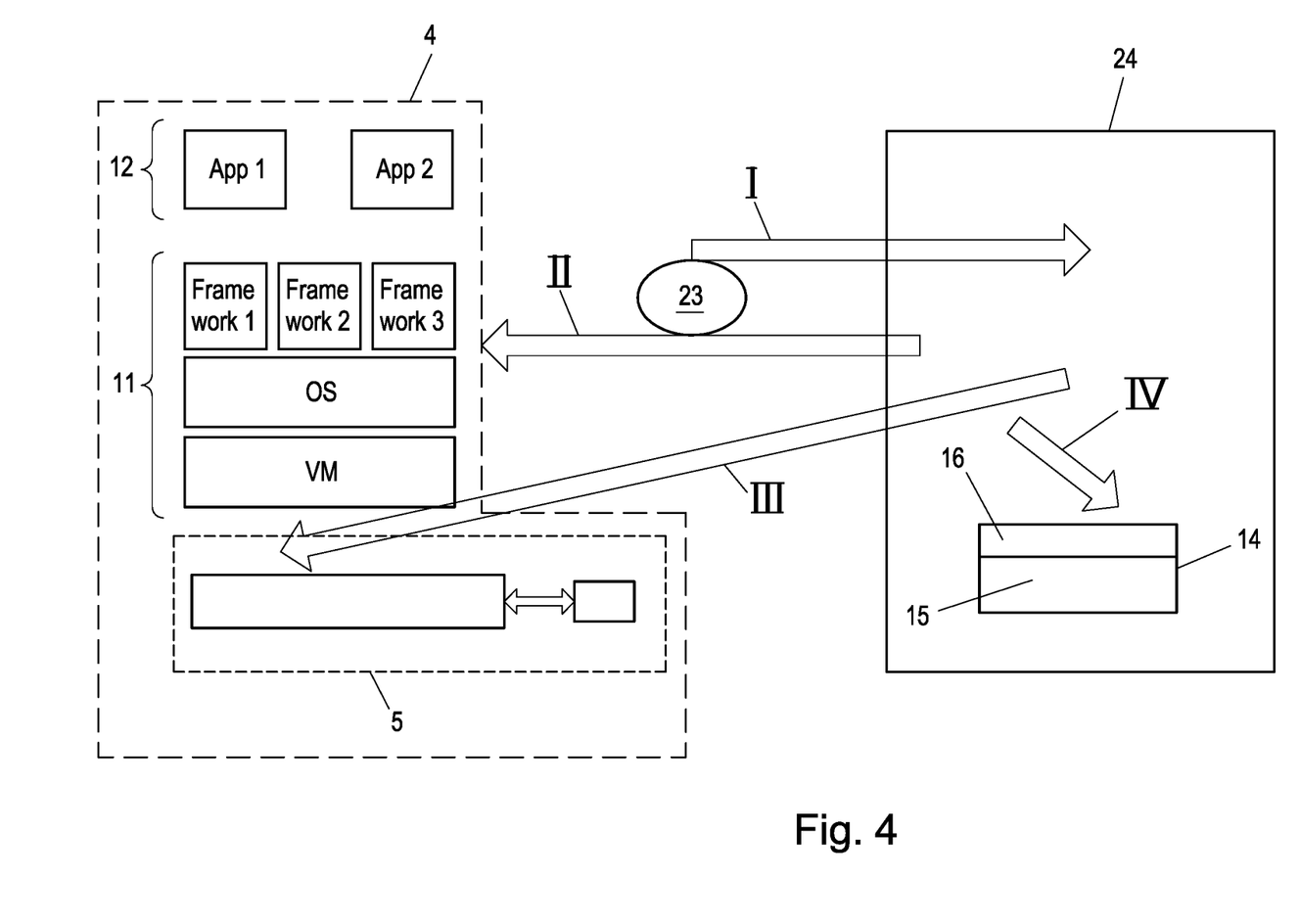
FIG. 4 is a schematic representation of the simulation carried out in the simulation environment and FIG. 5 is a diagram of a graphically processed result of a simulation.

FIG. 4 shows in a schematic representation the steps which are carried out in a test run using the method according to the invention. A tester 23 can operate the simulation environment 4 via the user interface 25 of the control and monitoring system 24 with the modeling of the simulation model 5 having already been completed in the illustration in FIG. 4. In definition step I, the tester defines the critical data 6, with this definition being based, in particular, on an analysis of the hardware system 1 and the application software 12 running on it. Critical data 6 to be monitored is specified by the user, for example, by means of a special marking, which can be done directly in the software, i.e., prior to the compilation. For this purpose, access to the source code and/or debugging information, such as symbol files, of the application software 12 is at least partially required. If necessary, the critical data can also be defined by specifying file properties, e.g., attributes relating to the data content, the time of creation, the time of processing, the address in the storage, etc., which is largely possible without access to the source code.

Accordingly, in connection with the present disclosure, "critical data" refers, in particular, to data that was defined as critical data in a definition step performed either by an executing person (e.g., a programmer or the tester 23) or on the basis of previously defined properties. The criteria for defining the critical data depend, in particular, on the respective individual case and the hardware system and/or data processing task to be examined. An average person skilled in the art is able to define critical data if he is familiar with the teachings disclosed herein.

Rules can be drawn up in connection with the definition of the critical data 6, e.g., "limits" can be described which must not be "exceeded" by the monitored critical data 6. These limits can relate to specific parts of the hardware, specific storage regions, specific parts in the CPU, etc., and divide these resources into a permitted domain 15 and a prohibited domain 16. These definitions can also contain further restrictions, for example, certain time periods or dependencies on system states. As a further feature for the definition of the domain, the context in which the process is executed can be used, for example under which (or for which) user the process is being executed or whether the processor is running in user or kernel mode, etc.

The test cases that are to be processed in the course of the simulation are also selected or defined in the definition step I. The modeling of the simulation model 5 can also take place in this step, or this modeling can be adapted.

It should be noted that the steps of modeling the simulation model 5, defining the critical data 6, selecting the test cases and defining the rules and limits can be carried out in any order, in parallel with one another or in iterative steps.

In step II, the application software 12 to be examined is set up in the simulation environment based on the application or test cases, and in step III, the simulation is started in the simulation environment 4, and the ongoing simulation is monitored by the control and monitoring system 24. Since the application software and any parts to be tested (frameworks, runtime libraries, operating system, . . . ) and the hardware "run" in the simulation environment 4, all access to critical data or the stream of critical data (and their copies) are observed, monitored and compared to the defined rules. Rule violations can be logged and/or reported as a warning message, thus creating information about possible data leaks. In addition, by recording the context and previous history of these findings (the complete sequence in the simulation environment 4 can be documented by using tracing methods), important support can be provided in the further diagnosis (or the debugging).

The control and monitoring system 24 has at least partial access to the internal registers and states of the simulation environment 4, which is similar to a typical debugger interface.

The critical data 6, every access to it, and all changes that can be derived from this data through software and hardware activities (e.g., flags in CPU registers) are thus observed and monitored. The path of the critical data can be stored by the control and monitoring system 24 and displayed in the evaluation 14, for example, in the form of traces in a tree structure (step IV).

Figure 5:
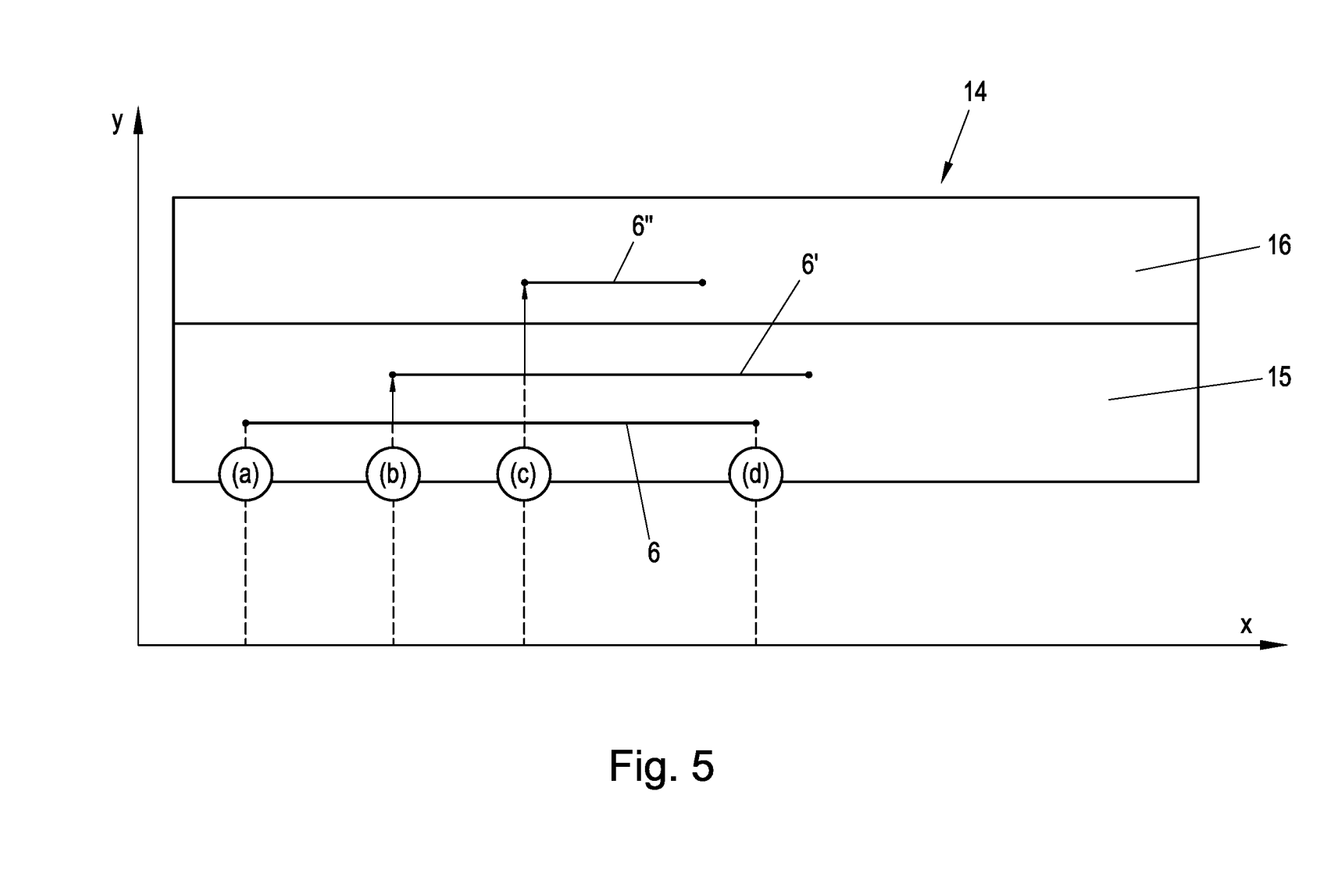

In FIG. 5, such an evaluation 14 for a critical datum 6 is shown as a tree structure by way of example. The x-axis represents the timing of the simulation, the y-axis shows the hardware portions divided into a permitted domain 15 and a prohibited domain 16.

In the example shown in FIG. 5, the monitoring of the critical datum 6 begins at time (a) (for example, when the critical datum is loaded into a memory of a hardware component 7). At time (b), in the course of a process step, a copy of the critical datum is created, which is designated as the first instance 6'. The first instance is located in a storage region that is assigned to the permitted domain 15. At time (c), a second instance 6" is generated from the first instance by copying and is stored in a memory that is assigned to the prohibited domain 16. This process is recognized and reported by the control and monitoring system 24. If necessary, a warning message can be generated and/or the simulation run can be discontinued. At time (d), the original of the critical datum is destroyed (for example, overwritten or deleted). However, the first instance 6' still exists at this point in time (but in the permitted domain). This is also noted and reported. In this way, all instances of the monitored critical datum 6 as well as access to it can be detected. A new instance typically forms the start node of a new sub-tree.

In practice, the evaluation 14 described above could, for example, document the following process: a monitored datum is uploaded from the external memory into a CPU register. However, this can typically result in a copy in the cache (possibly even on several levels), which also exists when the datum in the CPU register is deleted or overwritten. This copy (i.e., the first instance 6') must therefore be monitored again and thus forms a new branch in the graph in the corresponding position (for example, assigned to the cache). The transmission of a datum via a bus also potentially allows all receivers connected to the same bus to read this datum at this point in time (and subsequently to copy or process said datum). This is also documented and followed up with a new branch in the graph.

Another possibility is the processing of a monitored datum. A shift command, for example, shifts a binary datum by a number of bit positions and thus changes said datum. The result depends on the monitored datum and is therefore also documented as a new branch in the graph and followed up on.

The procedure disclosed herein allows, for example, for the development of a new family of tools for testing and diagnosing properties such as "confidentiality" and "privacy" in control devices and bus systems, in particular, in vehicles. In connection with the development of automated and autonomous vehicles, in particular, future control units for the drive train, driving functions, vehicle communication, passenger comfort (including eHealth) and payload management will process more and more personal and mission-critical data. Such data may only be disclosed or passed on in a defined manner and may not be accessed by chance or as a result of targeted attacks. With the help of the present invention, it is possible to test a wide variety of hardware systems in any level of detail for security-relevant data streams. The tests can also be scaled to any width, whereby, for example, a plurality of interacting systems can be simulated. Thanks to the scalable depth of detail, errors can be detected at various levels, be it in the application software, in the operating system or already in the hypervisor or even deeper, directly in the hardware implementation (this can be relevant for side-channel attacks, for example).

REFERENCE NUMERAL

Hardware system 1
Data processing task 2
Storage unit 3
Simulation environment 4
Simulation model 5
Critical data 6
Hardware component 7
Communication device 8
Communication unit 9
Processor unit 10
Operating system 11
Application software 12
Parameter data 13
Evaluation 14
Permitted domain 15
Prohibited domain 16
Processor 17
Processor core 18
Processor cache 19
Processor IO 20
BUS arrangement 21
Further component 22
Tester 23
Control and monitoring system 24
User interface 25

The invention claimed is:

1. Method for detecting security relevant data streams which occur in a hardware system during the execution of at least one data processing task, the method including the following steps:

dividing the hardware system into a variety of hardware components for mapping the hardware system onto a simulation model; wherein the hardware components are connected to one another via at least one communication device and configured and arranged to exchange data via this communication device; wherein each of the hardware components has at least one communication unit, at least one storage unit and at least one processor unit;

mapping the hardware system onto the simulation model capable of running in a simulation environment, and simulating the data streams, occurring during the execution of the at least one data processing task, with the simulation model of the hardware system, wherein the data streams executed by the individual hardware components are observed and logged during the simulation in the simulation environment and wherein the data streams comprise creating a copy of a datum stored at a storage address of a storage unit at another storage address of the same storage unit or a different storage unit, changing a datum or a copy of a datum, deleting a datum stored at a storage address of a storage unit, transmitting a datum from a hardware component via a communication device used by a plurality of hardware components to one or more other hardware components or transmitting and receiving data via external interfaces of the hardware system;

defining critical data, which may be stored in at least one storage unit of the hardware system and/or transferred to the hardware system via an interface, wherein the hardware components of the hardware system are divided into a permitted domain and a prohibited domain based on whether the processor is running in a user or kernel mode, and wherein at least the following data streams are identified as security-relevant data streams:

transmission of a critical datum or instances thereof via a communication device of the prohibited domain, deletion of a critical datum while an instance of the critical datum continues to exist, creation of an instance of a critical datum in the prohibited domain, continued existence of a critical datum after a particular point in time and/or system status;

monitoring the creation, transmission and deletion of the critical data and instances of the critical data in the simulation model during the execution of the at least one data processing task, and identifying and logging the security-relevant data streams.

2. The method according to claim 1, characterized in that the critical data is defined by defining data properties.

3. The method according to claim 1, further including creating a warning message when at least security-relevant data streams are identified.

4. The method according to claim 3, characterized in that the evaluation is displayed graphically.

5. The method according to claim 1, characterized in that the detected security relevant data streams are stored in an evaluation.

6. The method according to claim 1, characterized in that the course of the simulation is logged.

7. The method according to claim 1, characterized in that the at least one data processing task results from the execution of application software, which is operated, if applicable, while processing defined test cases.

8. The method of claim 1, wherein the continued existence of the critical datum after a critical point in time and/or system status is after completion of the at least one data processing task.

* * * * *